United States Patent
Gree

(10) Patent No.: US 10,439,677 B2
(45) Date of Patent: Oct. 8, 2019

(54) NFC CONTROLLER

(71) Applicant: NXP B.V., Eindhoven (NL)

(72) Inventor: Maxime Gree, Caen (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/050,477

(22) Filed: Jul. 31, 2018

(65) Prior Publication Data

US 2019/0089414 A1   Mar. 21, 2019

(30) Foreign Application Priority Data

Sep. 19, 2017   (EP) .................................... 17306214

(51) Int. Cl.
*H04B 5/00*   (2006.01)

(52) U.S. Cl.
CPC ......... *H04B 5/0031* (2013.01); *H04B 5/0037* (2013.01); *H04B 5/0056* (2013.01); *H04B 5/0081* (2013.01)

(58) Field of Classification Search
CPC ...................................................... H04W 4/80
See application file for complete search history.

(56) References Cited

U.S. PATENT DOCUMENTS

| | | | | |
|---|---|---|---|---|
| 2009/0179761 A1* | 7/2009 | Chang | ....................... | G06F 1/32 340/572.1 |
| 2012/0134444 A1* | 5/2012 | Tsukamoto | ............. | H04L 27/06 375/320 |
| 2014/0256270 A1* | 9/2014 | Cho | ......................... | H04B 5/02 455/77 |
| 2015/0137953 A1* | 5/2015 | Tramoni | ............ | G06K 19/0701 340/10.5 |
| 2015/0381238 A1* | 12/2015 | Wolf | ....................... | H04W 4/80 455/41.1 |
| 2017/0019152 A1* | 1/2017 | Kim | ..................... | H04B 5/0031 |
| 2017/0163357 A1 | 6/2017 | Cordier | | |
| 2018/0062639 A1* | 3/2018 | Rezayee | .............. | H03K 3/0375 |
| 2018/0176711 A1* | 6/2018 | Hueber | ................ | H04B 5/0075 |

OTHER PUBLICATIONS

Gebhart, M., "Active Load Modulation for Contactless Near-Field Communication", International Conference on RFID—Technologies and Applications (RFID—TA), IEEE 2012.

* cited by examiner

*Primary Examiner* — Wen W Huang

(57) ABSTRACT

In accordance with a first aspect of the present disclosure, a near field communication (NFC) controller is provided, comprising a load modulation amplitude control unit configured to control a load modulation amplitude of one or more signals transmitted through an NFC antenna, wherein said load modulation amplitude control unit is further configured to change said load modulation amplitude in dependence on a supply voltage. In accordance with a second aspect of the present disclosure, a corresponding method of operating a near field communication (NFC) controller is conceived. In accordance with a third aspect of the present disclosure, a corresponding computer program is provided.

15 Claims, 3 Drawing Sheets

NFC CONTROLLER

CROSS-REFERENCE TO RELATED APPLICATIONS

This application claims the priority under 35 U.S.C. § 119 of European Patent application no. 17306214.2, filed on 19 Sep. 2017, the contents of which are incorporated by reference herein.

FIELD

The present disclosure relates to an NFC controller. Furthermore, the present disclosure relates to a method of operating an NFC controller, and to a corresponding computer program. The use of near field communication (NFC) enables the wireless transmission of data over relatively short distances. NFC-enabled mobile devices often contain a host processor and an NFC controller which is operatively coupled to the host processor. The NFC controller is configured to control the near field communication between the NFC device and an external device, for example an NFC reader. The NFC-enabled mobile device may operate in a so-called card mode, which means that it may emulate a smart card. In some applications, it is important that the communication between the NFC reader and the NFC-enabled mobile device is stable and reliable.

SUMMARY

In accordance with a first aspect of the present disclosure, a near field communication (NFC) controller is provided, comprising a load modulation amplitude control unit configured to control a load modulation amplitude of one or more signals transmitted through an NFC antenna, wherein said load modulation amplitude control unit is further configured to change said load modulation amplitude in dependence on a supply voltage.

In an embodiment, the NFC controller further comprises a memory in which different sets of transmitter settings are stored, wherein changing the load modulation amplitude comprises retrieving a specific set of transmitter settings from said memory and loading the retrieved specific set into a transmitter.

In an embodiment, the memory is an electrically erasable programmable read-only memory.

In an embodiment, the load modulation amplitude control unit is implemented in firmware.

In an embodiment, the supply voltage is a voltage output by a transmitter voltage regulator.

In an embodiment, the load modulation amplitude control unit is configured to receive a trigger signal that indicates that the voltage output by the transmitter voltage regulator is below a predefined threshold, and the load modulation amplitude control unit is configured to increase the load modulation amplitude in response to receiving said trigger signal.

In an embodiment, the threshold is within the range of 3.2 volts to 3.7 volts.

In an embodiment, the voltage output by the transmitter voltage regulator is dependent on a battery output.

In an embodiment, an NFC-enabled mobile device comprises an NFC controller of the kind set forth.

In accordance with a second aspect of the present disclosure, a method of operating a near field communication (NFC) controller is conceived, comprising that a load modulation amplitude control unit of said NFC controller controls a load modulation amplitude of one or more signals transmitted through an NFC antenna, wherein said load modulation amplitude control unit changes said load modulation amplitude in dependence on a supply voltage.

In an embodiment, changing the load modulation amplitude comprises retrieving a specific set of transmitter settings from a memory of the NFC controller, and loading the retrieved specific set into a transmitter.

In an embodiment, the supply voltage is a voltage output by a transmitter voltage regulator.

In an embodiment, the load modulation amplitude control unit receives a trigger signal that indicates that the voltage output by the transmitter voltage regulator is below a predefined threshold, and the load modulation amplitude control unit increases the load modulation amplitude in response to receiving said trigger signal.

In an embodiment, the voltage output by the transmitter voltage regulator is dependent on a battery output.

In accordance with a third aspect of the present disclosure, a computer program is provided that comprises non-transient executable instructions which, when executed, carry out a method of the kind set forth.

DESCRIPTION OF DRAWINGS

Embodiments will be described in more detail with reference to the appended drawings, in which.

DESCRIPTION OF EMBODIMENTS

Figure 1:
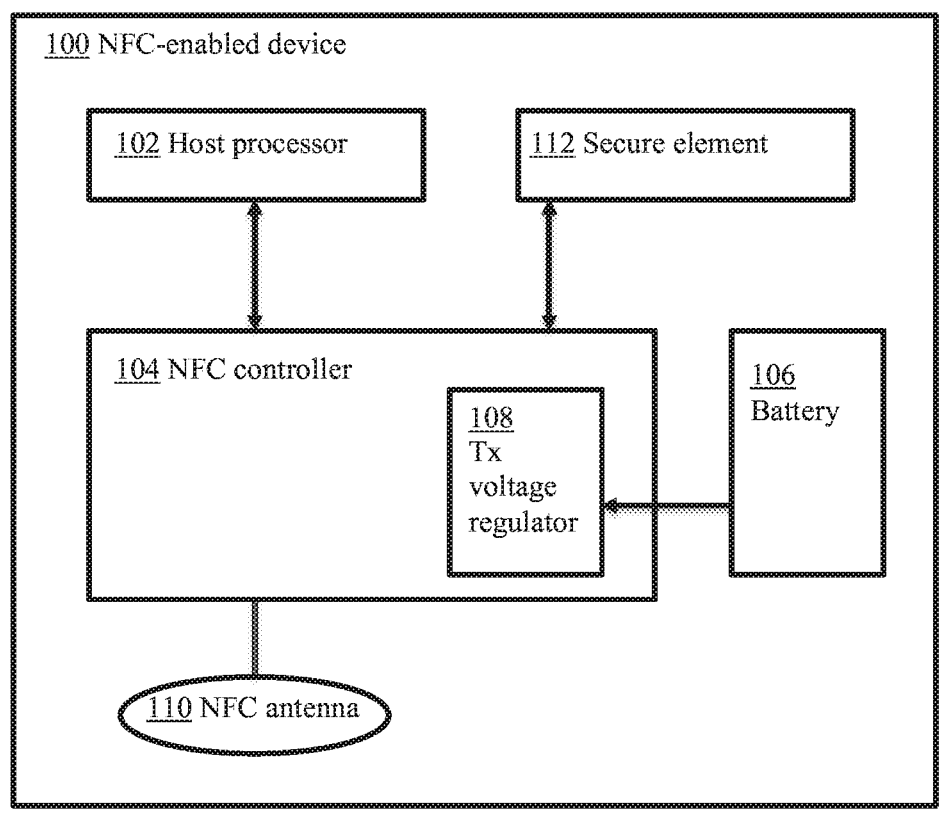
FIG. 1 shows an example of an NFC-enabled device.

FIG. 1 shows an example of an NFC-enabled device 100. The NFC-enabled device 100 may for example be a smart phone, a tablet, or a wearable device (e.g., a smart watch). The NFC-enabled device 100 comprises a host processor 102. Furthermore, the NFC-enabled device 100 comprises an NFC controller 104 operatively coupled to the host processor 102 and to a secure element 112. The NFC controller 104 is configured to control near field communication between the NFC-enabled device 100 and an external device, such as an NFC reader (not shown). The NFC-enabled device 100 comprises an NFC antenna 110 for enabling the near field communication. Furthermore, the NFC controller 104 comprises a transmitter voltage regulator 108 operatively coupled to a battery 106. The transmitter voltage regulator 108 is configured to provide power to a transmitter (not shown) of the NFC controller 104. An input (Vup) of the transmitter voltage regulator 108 is coupled to the battery 106; thus, the battery provides power to the transmitter voltage regulator 108. Under most circumstances, the output of the transmitter voltage regulator 108 follows the output of the battery 106 (Vbat). However, if the battery output decreases (e.g., because the battery 106 is nearly empty)—and, as a consequence, the output of the transmitter voltage regulator 108 also decreases—then the load modulation amplitude (LMA) in the card mode may also decrease, which negatively affects the communication with the external device.

To guarantee interoperability between contactless card readers and transponders, international standards specify properties of the air interface. For example, ISO/IEC 14443 is the fundamental international standard for proximity cards, ISO/IEC 10373-6 is the test standard for proximity systems, EMVCo is the industry standard for payment and ECMA 340 is the Near Field Communication (NFC) interface and protocol. Conformance of the contactless card readers and transponders to these standards is very important and in some instances this conformance needs to be certified by an accredited test laboratory. A number of properties are specified for the air interface of contactless products by the international standards. One property is the so-called load modulation amplitude (LMA).

For example, in the communication link from a device in card mode (hereinafter referred to as the transponder device) to a device in contactless reader mode (hereinafter referred to as the contactless reader), the information is communicated using load modulation. Due to the inductive proximity coupling between the loop antenna circuit of the reader and the loop antenna circuit of the transponder device, the presence of the transponder device affects the contactless reader and is typically referred to as the "card loading effect". From the perspective of the contactless reader, a change in resonance frequency and a decrease in the Quality (Q) factor of the resonant circuit occurs. If the contactless reader/transponder device coupling system is viewed as a transformer, the transponder device represents a load to the contactless reader. Modulating the frequency and Q of the transponder loop antenna circuit produces a modulation of the load on the contactless reader. The contactless reader detects this load modulation at the reader antenna as an AC voltage. Each standard typically specifies a minimum limit for the load modulation amplitude that needs to be achieved by the transponder device in card mode. It is therefore important that the load modulation amplitude does not decrease too much.

Therefore, in accordance with the present disclosure, an NFC controller is provided, comprising a load modulation amplitude control unit configured to control a load modulation amplitude (LMA) of one or more signals transmitted through an NFC antenna, wherein said load modulation amplitude control unit is further configured to change said LMA in dependence on a supply voltage. In this way, the LMA may be boosted if the supply voltage decreases. In a practical and efficient implementation, the LMA control unit may be configured to change the LMA by retrieving a specific set of transmitter settings from a memory of the NFC-enabled device, and by loading the retrieved set into a transmitter. The transmitter may contain registers containing parameters that influence the LMA; examples of these parameters are the active load modulation (ALM) type and the transmitter amplitude residual carrier. Different sets of settings may be predefined, for example one set for normal circumstances, and one or more other sets for exceptional circumstances, such as a low supply voltage. The set for normal circumstances may for example be used by default. If the supply voltage decreases, one of the other sets may be retrieved from the memory and loaded into the transmitter's registers.

Figure 2:
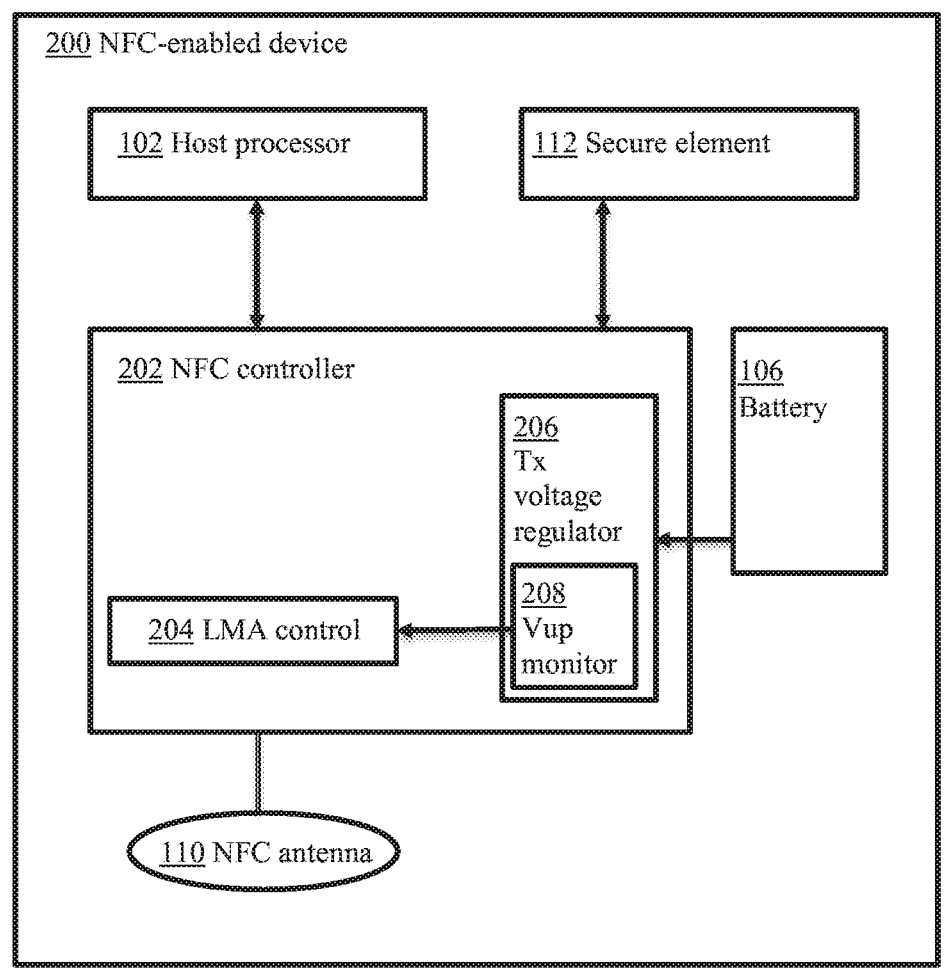
FIG. 2 shows an illustrative embodiment of an NFC-enabled device.

FIG. 2 shows an illustrative embodiment of an NFC-enabled device 200. The NFC-enabled device 200 comprises, besides the host processor 102, secure element 112 and battery 106, and NFC antenna 110 shown in FIG. 1, an NFC controller 202 that comprises an LMA control unit 204, and a voltage transmitter regulator 206 that comprises a Vup monitor 208. The Vup monitor 208 monitors the output of the battery 106. If, for example, the output of the battery drops below a predefined threshold, then the Vup monitor 208 transmits a trigger signal to the LMA control unit 204. Upon receipt of said trigger signal, the LMA control unit 204 increases the LMA, for example by loading specific transmitter settings as described above. Thus, in an embodiment, the supply voltage is a voltage output by a transmitter voltage regulator, and the LMA control unit is configured to receive a trigger signal that indicates that the voltage output by the transmitter voltage regulator is below a predefined threshold. Furthermore, the LMA control unit is configured to increase the load modulation amplitude in response to receiving said trigger signal. In this way, no active monitoring needs to be performed by the NFC controller. Thus, the NFC controller may perform its primary function (i.e. NFC control) without being burdened by a secondary function (i.e. supply voltage monitoring). Alternatively, the NFC controller may, before initiating a transmission in the card mode, evaluate the Vup monitor 208 (e.g., by transmitting a request for a supply voltage indicator). In a practical and efficient implementation, the predefined threshold is within the range of 3.2 volts to 3.7 volts.

Figure 3:
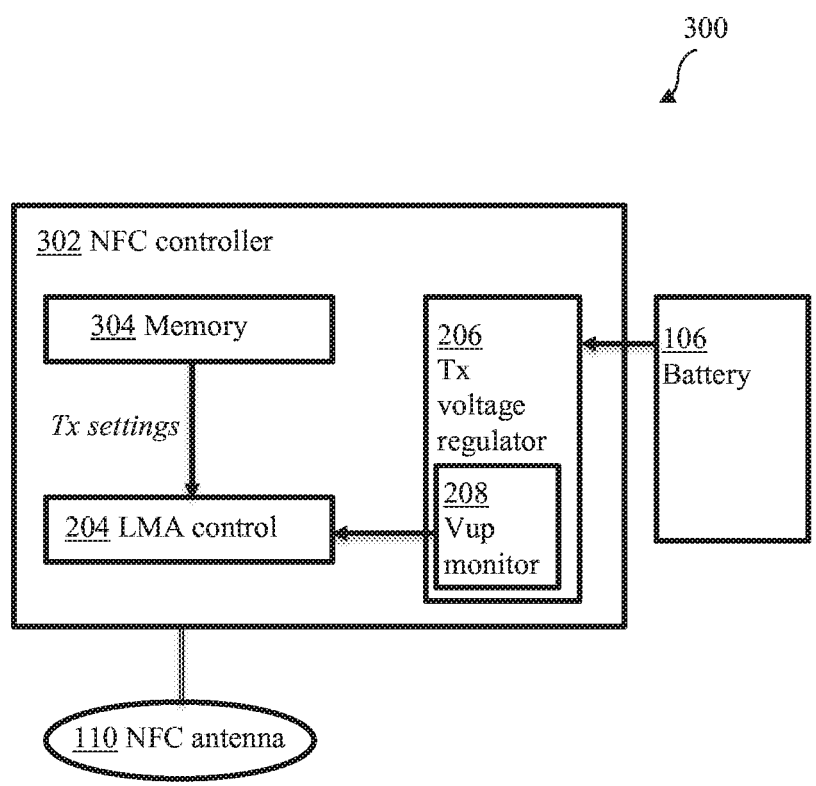
FIG. 3 shows an illustrative embodiment of a subsystem of an NFC-enabled device.

FIG. 3 shows an illustrative embodiment of a subsystem 300 of an NFC-enabled device. The subsystem 300 comprises, besides the transmitter voltage regulator 206, battery 106 and NFC antenna 110 shown in FIG. 2, an NFC controller 302 that comprises the LMA control unit 204 and a memory 304 operatively coupled to the LMC control unit 204. As mentioned above, the LMA control unit 204 may, in operation, change the LMA by retrieving specific sets of transmitter settings from the memory 304. It is noted that the term "set" may refer to a set containing only a single transmitter setting. Subsequently, the LMA control unit 204 may load the retrieved set into registers of a transmitter (not shown). In a practical and efficient implementation, the memory 304 may be an electrically erasable programmable read-only memory (EEPROM). Furthermore, in a practical and efficient implementation, the LMA control unit 204 may be implemented in firmware.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "mobile device" refers to any type of portable electronic device, including a cellular telephone, a Personal Digital Assistant (PDA), smartphone, tablet etc. Furthermore, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 NFC-enabled device
102 host processor
104 NFC controller
106 battery
108 transmitter voltage regulator
110 NFC antenna
112 secure element
200 NFC-enabled device
202 NFC controller
204 LMA control
206 transmitter voltage regulator
208 Vup monitor
300 subsystem of NFC-enabled device
302 NFC controller
304 memory

The invention claimed is:

1. A near field communication, NFC, controller comprising a load modulation amplitude control unit configured to control a load modulation amplitude of one or more signals transmitted through an NFC antenna, wherein said load modulation amplitude control unit is further configured to change said load modulation amplitude in dependence on a supply voltage, the supply voltage being a voltage output by a transmitter voltage regulator, wherein the load modulation amplitude control unit is further configured to receive a trigger signal that indicates that the voltage output by the transmitter voltage regulator is below a predefined threshold, the threshold being within the range of 3.2 volts to 3.7 volts, and wherein the load modulation amplitude control unit is further configured to increase the load modulation amplitude in response to receiving said trigger signal.

2. The NFC controller of claim 1, further comprising a memory in which different sets of transmitter settings are stored, and wherein changing the load modulation amplitude comprises retrieving a specific set of transmitter settings from said memory and loading the retrieved specific set into a transmitter.

3. The NFC controller of claim 2, wherein the memory is an electrically erasable programmable read-only memory.

4. The NFC controller claim 1, wherein the load modulation amplitude control unit is implemented in firmware.

5. The NFC controller of claim 1, wherein the voltage output by the transmitter voltage regulator is dependent on a battery output.

6. An NFC-enabled mobile device comprising an NFC controller comprising a load modulation amplitude control unit configured to control a load modulation amplitude of one or more signals transmitted through an NFC antenna, wherein said load modulation amplitude control unit is further configured to change said load modulation amplitude in dependence on a supply voltage, the supply voltage being a voltage output by a transmitter voltage regulator, and wherein the load modulation amplitude control unit is further configured to receive a trigger signal that indicates that the voltage output by the transmitter voltage regulator is below a predefined threshold being within the range of 3.2 volts to 3.7 volts.

7. A method of operating a near field communication, NFC, controller, comprising that a load modulation amplitude control unit of said NFC controller controls a load modulation amplitude of one or more signals transmitted through an NFC antenna, wherein said load modulation amplitude control unit changes said load modulation amplitude in dependence on a supply voltage, the supply voltage being a voltage output by a transmitter voltage regulator, and wherein the load modulation amplitude control unit receives a trigger signal that indicates that the voltage output by the transmitter voltage regulator is below a predefined threshold being within the range of 3.2 volts to 3.7 volts.

8. The method of claim 7, wherein changing the load modulation amplitude comprises retrieving a specific set of transmitter settings from a memory of the NFC controller, and loading the retrieved specific set into a transmitter.

9. The method of claim 8, wherein the memory is an electrically erasable programmable read-only memory (EE-PROM).

10. The method of claim 8, wherein the transmitter settings includes a predefined set for low supply voltage.

11. The method of claim 7, wherein the load modulation amplitude control unit increases the load modulation amplitude in response to receiving said trigger signal.

12. The method of claim 11, further comprising monitoring voltage output by the transmitter voltage regulator with a voltage monitor in the transmitter voltage regulator to generate the trigger signal.

13. The method of claim 7, wherein the voltage output by the transmitter voltage regulator is dependent on a battery output.

14. A computer program comprising non-transient executable instructions that, when executed, carry out the method of claim 7.

15. The method of claim 7, further comprising implementing the load modulation amplitude control unit in firmware.

* * * * *